United States Patent [19]

Barriere

[11] 4,290,625
[45] Sep. 22, 1981

[54] FOLDABLE LUGGAGE CARRYING DEVICE

[76] Inventor: Alain Barriere, 30, rue Buffon, 94210 La Varenne, France

[21] Appl. No.: 87,781

[22] Filed: Oct. 24, 1979

[30] Foreign Application Priority Data

Feb. 12, 1979 [FR] France .............................. 79 03442
Jul. 18, 1979 [FR] France .............................. 79 18575

[51] Int. Cl.³ .......................... A45C 13/38; B62B 1/04
[52] U.S. Cl. ................................ 280/654; 280/47.28; 280/47.19; 280/655; 297/129
[58] Field of Search ............ 280/652, 654, 655, 47.18, 280/47.19, 47.25, 47.28, 47.29, 79.1 R, 47.27, 648; 297/129, 118, 16, DIG. 4

[56] References Cited

U.S. PATENT DOCUMENTS

| 2,541,263 | 2/1951 | Mayo et al. ........................ 280/648 |
| 2,658,703 | 11/1953 | Brink et al. ........................ 280/655 |
| 2,957,700 | 10/1960 | Beaurline ........................... 280/654 |
| 3,997,213 | 12/1976 | Smith et al. ........................ 280/652 |

FOREIGN PATENT DOCUMENTS

| 1247232 | 10/1960 | France .............................. 280/47.18 |
| 480218 | 12/1969 | Switzerland ..................... 280/47.18 |
| 597785 | 4/1978 | Switzerland ..................... 280/652 |

Primary Examiner—David M. Mitchell
Attorney, Agent, or Firm—Sandler & Greenblum

[57] ABSTRACT

A foldable luggage carrying device is disclosed which has relatively moveable frame members which enable the device to be convertible into multiple position for different uses. When used as a luggage carrier a second frame member is moved into position as an extension of the first frame member and luggage is carried on a luggage support at the bottom of the first frame member. The second frame member includes a seat unit and seat back so that if desired a user can place a support or prop on the ground so that the second frame member will be perpendicular to the first frame member to form a seat. If it is desired to carry the unit without luggage, the frame elements are moved into an inoperative position such that the support and both frame members are collapsed and locked together. This results in a compact and easy to carry unit.

7 Claims, 5 Drawing Figures

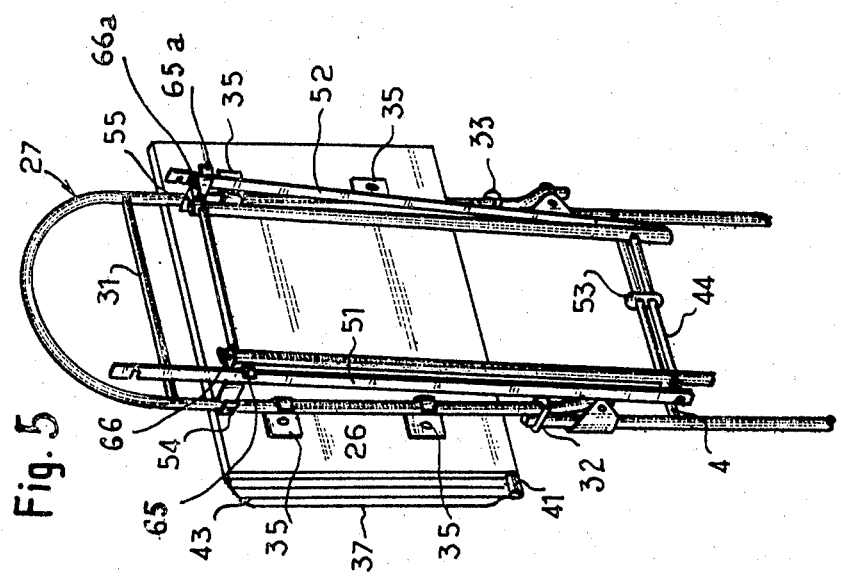
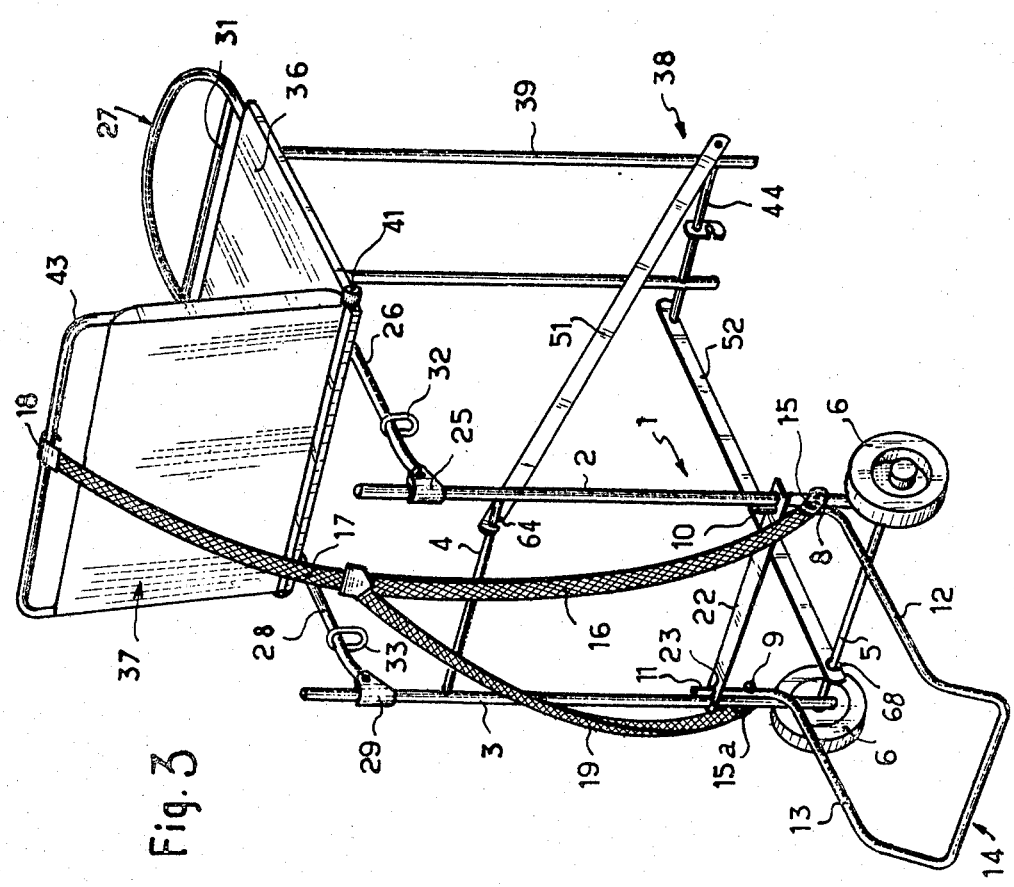

FOLDABLE LUGGAGE CARRYING DEVICE

BACKGROUND OF THE INVENTION

1. Field of the Invention

The present invention relates to a luggage carrying device used for shopping or for facilitating the transport of suitcases, bags and similar items.

2. Description of Prior Art

Numerous folding luggage carrying devices are known which comprise a framework including one frame provided at its lower end with rollers and with a support for the luggage or goods and a second frame joined to the upper end of the first frame. The other end of the second frame is connected to the first frame in such a way that it can occupy a position for use in which it forms an extension of the first frame and a retracted position in which it is folded against the second frame so that the device only occupies a moderate amount of space.

SUMMARY OF THE INVENTION

It is an object of the present invention to provide a new and improved luggage carrying device which can be converted into a plurality of positions.

A further object of the present invention is to provide a new and improved luggage carrying device which the user can convert into a seat for use while waiting on railway platforms and in other similar circumstances.

Another object of the present invention is to provide a new and improved luggage carrying device which can be collapsed such that it is compact and easily carried when not in use.

A still further object of the present invention is to provide a new and improved luggage carrying device which can be converted from an inoperative position into an operative position in which a luggage carrier facilitating the transportation of suitcases, grocery bags and similar items is formed.

Upon further study of the specification and appended claims, further objects and advantages of this invention will become apparent to those skilled in the art.

Briefly, the above and other objects of the present invention are attained in one aspect thereof by providing a foldable luggage carrying device comprised of two frames moveably mounted to each other. The first frame has rollers and a luggage support at one end and is attached to the second frame at its second end. The second frame is moveable from an operative position in which it forms an extension of the first frame to an inoperative position in which it is tilted against the first frame. A support is connected to the second frame so that when the support rests on the ground or other surface the second frame can extend in any direction perpendicular to the first frame.

BRIEF DESCRIPTION OF DRAWINGS

The invention will now be described in greater detail in reference to a particular embodiment thereof, described solely by way of an example and shown in the attached drawings in which:

FIG. 3 is a perspective view of the luggage carrying device in its intermediary position in which it can form a seat;

FIG. 5 is a partial perspective view of the retracted prop attached to a portion of the frame.

DESCRIPTION OF THE PREFERRED EMBODIMENTS

The device to which the present invention relates is of the type comprising a framework comprising a first frame fitted at one end with rollers and a support for luggage and at the other end with a second frame tiltably mounted thereto in such a way that it can occupy an operative position in which it generally forms an extension of the first frame and an inoperative position in which it is tilted against the first frame. The device further includes a prop which is jointed to the second frame in the vicinity of the free end thereof and which can rest on the ground in a position in which the second frame extends in a direction substantially perpendicular to the first frame. Such an arrangement causes the second frame to extend horizontally when the free end of the prop is resting on the ground and creates a seat on which the user can sit.

Figure 1:
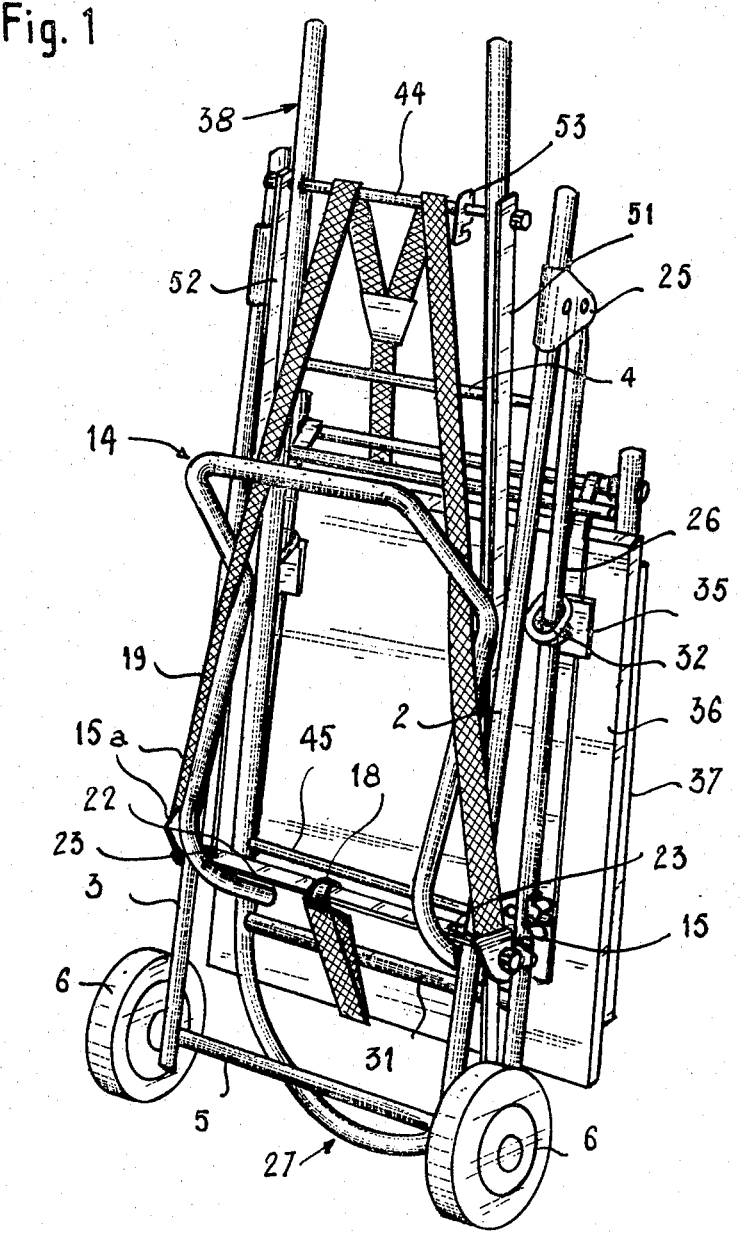
FIG. 1 is a perspective view of the luggage carrying device of the present invention shown in its inoperative position.
Figure 2:
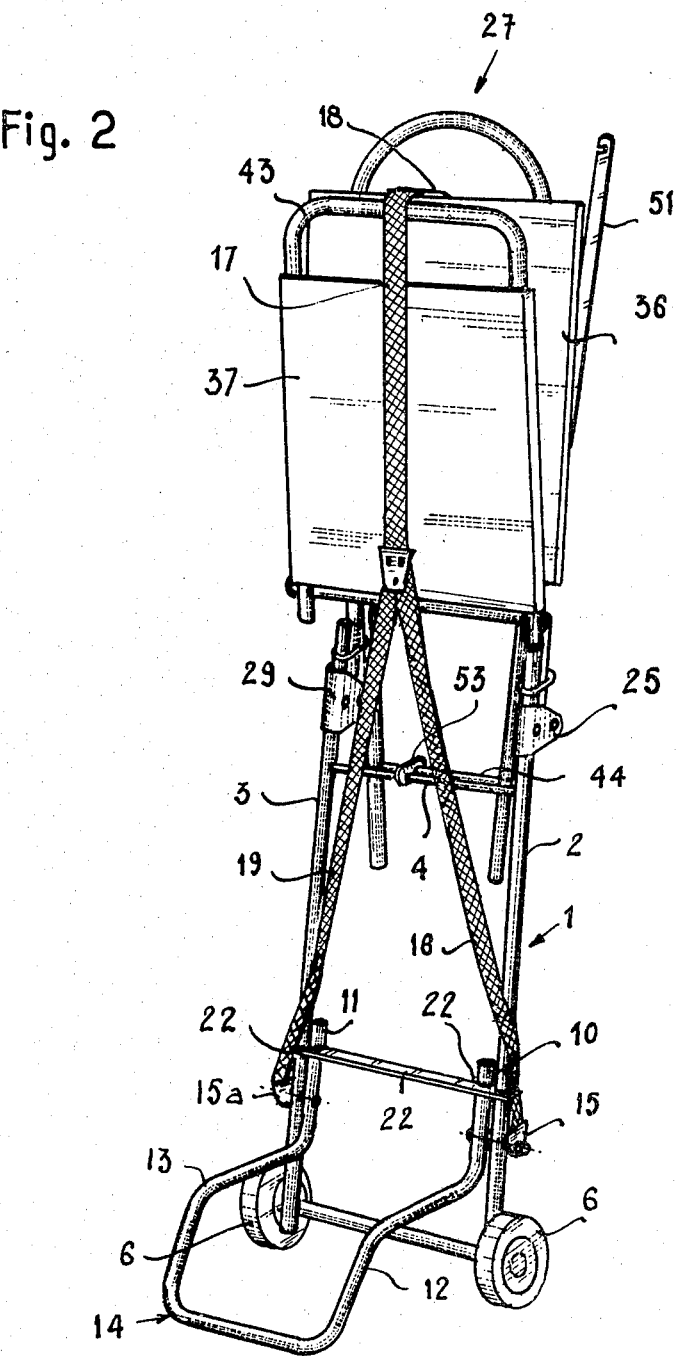
FIG. 2 is a perspective view showing the luggage carrying device in its operative position for transporting and carrying suitcases.

The luggage carrying device shown in FIGS. 1, 2, and 3 comprises a framework including a first frame 1 having upright sections 2 and 3, a horizontal upper bar 4, and a horizontal lower bar 5 which constitutes an axle for rollers 6.

Shafts 8 and 9 of upright sections 2 and 3 are journalled to extensions 10 and 11 of branches 12 and 13, respectively, of U-shaped support 14. A clamp 15 is attached to shaft 8 and affixed to one of the ends of a first flexible band 16. The other end of band 16 is connected to a first end of a second flexible band 17, which terminates in a hook 18 at its second end. Similarly, a clamp 15a is mounted upon shaft 9 and affixed to one end of a third flexible band 19, the other end of the flexible band being connected in turn to the band 17.

A locking bar 22 is slidably mounted upon upright sections 2 and 3. The bar has oblong holes 23 through which extensions 10 and 11 are inserted in order to secure the support 14 in either of its operative positions, as illustrated in FIGS. 2 and 3.

A second frame 27, also generally U-shaped, is connected to the upright sections 2 and 3 near their respective upper free ends. Upright section 2 includes an end clamp 25 between the wings of which is journalled one end of the side portion 26 of the second frame. One end of the other side portion 28 of the second frame is journalled between the wings of an end clamp 29 located near the upper free end of upright section 3.

Second frame 27 further comprises a crossbar 31 and locking rings 32 and 33 engaging sides 26 and 28, respectively. The rings fit onto the free ends of the uprights 2 and 3 so as to secure the second frame in its operative position, i.e., a position in which it forms an extension of first frame 1.

A seat unit 36 is mounted on second frame 27 by elastic hooks 35 which engage side portions 26 and 28. The seat includes a back 37 journalled to a shaft 41 such that it can be folded against the seat unit 36 when the device is not being used in the seat position or that it can be extended in a direction substantially perpendicular to the seat unit 36 when the device is in its operative seat position, as illustrated in FIG. 3. The back 37 includes a metal frame 43 which can be engaged by hook 18.

Figure 4:
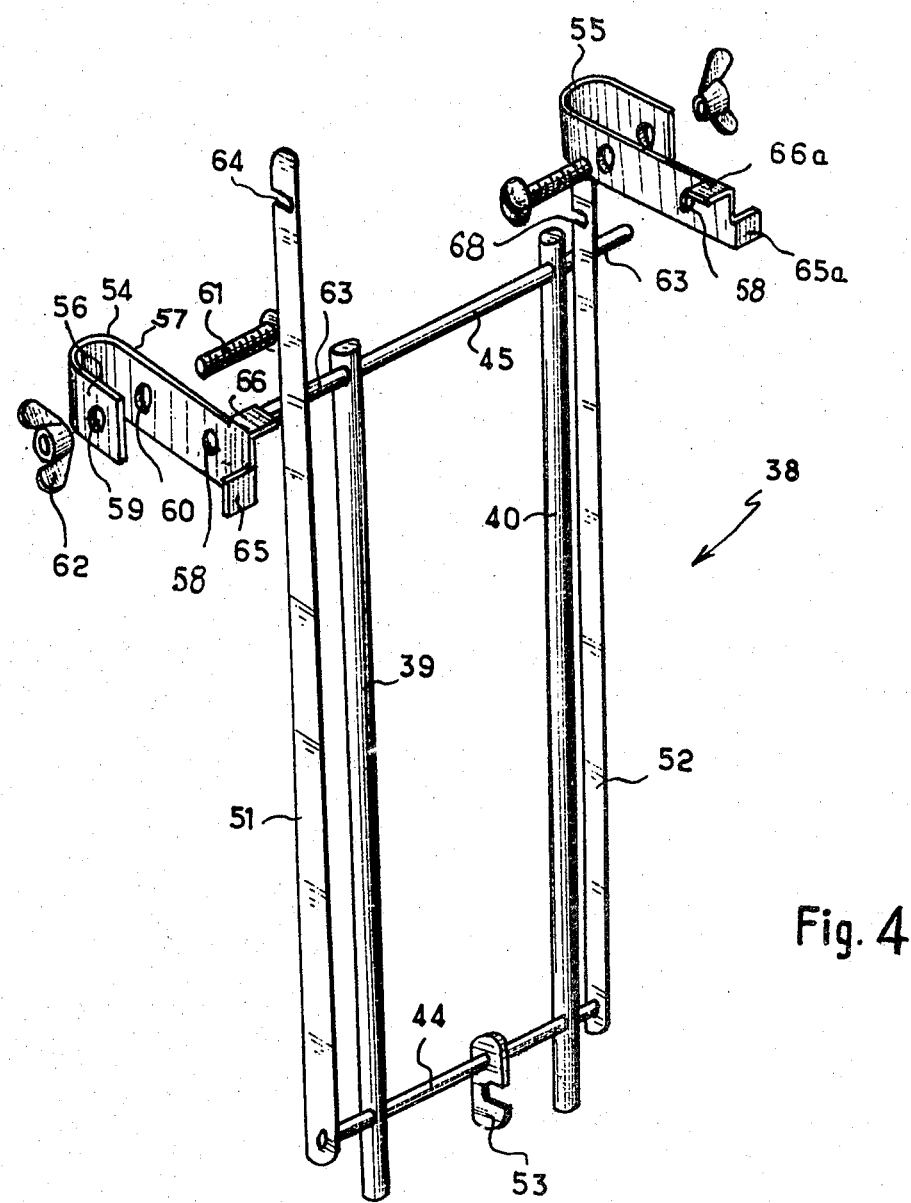
FIG. 4 is an exploded view of a prop with which the luggage carrying device is to be equipped.

FIG. 4 is an exploded perspective view of a moveable support or prop 38. The support comprises two substantially parallel bars 39 and 40 interconnected at one end by a crossbar 45 and near their other end by a crossbar 44 which acts as an articulation shaft for the support. The crossbar 45 extends at both ends into two shaft stubs 63 adapted to engage bearing orifices 58 of clamps 54 and 55. The clamps are thereby movable about the shaft stub. The clamp 54 comprises a plate bent into a generally U-shaped configuration having two branches 56 and 57, branch 57 having a supporting bearing 58 and being longer than branch 56. Branches 56 and 57 include holes 59 and 60, respectively, which are adapted to receive a screw 61. A wing nut is screwed onto each screw so as to secure it. Clamp 54 is adapted to be placed on the side portion 26 of the second frame in the vicinity of crossbar 31 (see FIG. 5). Clamp 55 is constructed similarly to clamp 54 and accordingly need not be described in great detail herein. Clamp 55 is adapted to be affixed to side portion 28 of the second frame. Crossbar 44 extends on both sides of bars 39 and 40 and constitutes a shaft for struts 51 and 52. Strut 51 is longer than strut 52 and terminates at its free end in a hook 64 adapted to engage the upper horizontal bar 4 of the first frame 1. Strut 52 similarly terminates in a hook 68 and is of sufficient length to enable it to engage the lower horizontal bar 5 of frame 1. Clamp 54 includes stops 65 and 66 and clamp 55 similarly includes stops 65a and 66a.

As illustrated in FIG. 5, a hook 53 is rotatably mounted upon crossbar 44 and engages horizontal bar 4 of frame 1 when the device is used as a luggage carrier, i.e. when it is not necessary for the support to rest on the ground.

As best illustrated by FIG. 5, when the carrying device is in position to move suitcases, packages, and similar objects, prop 38 is folded back against frame 27 and affixed by hook 53 to upper bar 4. In this position struts 51 and 52 are secured by stops 65 and 65a, respectively. Stops 66 and 66a limit the pivoting movement of bars 39 and 40 when prop 38 is tilted in order to move it into the position in which it enables the device to be converted into a seat.

As best illustrated by FIG. 1, the device, once folded, even with the attached prop, occupies very little space and can be placed inside a small suitcase or bag.

The elements of the device assume different positions depending upon the use to which the device is intended. If the device, as illustrated in FIGS. 2 and 5, is used as a carrier for the transport of luggage, second frame 27 is secured by rings 32 and 33 in the position in which it forms an extension of first frame 1. At the same time, prop 38 is secured by its hook 53 to crossbar 4, strut 51 is secured by stop 65 and strut 52 is secured by stop 65a. Struts 51 and 52 are somewhat elastic and assume a position behind the stops by undergoing a slight elastic deformation.

In order for the device to assume the seat position illustrated by FIG. 3, hook 53 and rings 32 and 33 are released, followed by the release of struts 51 and 52, hook 18 then being withdrawn from crossbar 31 and engaged upon frame 43.

Second frame 27 rotates about the shaft of end clamps 25 and 29 at the same time that prop 38 assumes a position perpendicular to frame 27, the tilting movement of the prop 38 being limited by stops 66 and 66a. To render the assembly sufficiently stable, hook 64 is engaged upon crossbar 4 and hook 68 upon crossbar 5. As the back 37 is not in its raised position, the device comprises a comfortable seat. To return the device to its operative carrying position as shown in FIGS. 2 and 5 the foregoing operation is reversed.

Prop 38 can remain affixed to second frame 27 even when the device is in its completely inoperative position, as illustrated in FIG. 1. In such a position hook 53 is released and the free end of prop 38 is engaged through frame 1, between bars 4 and 5, and is maintained against bar 4 by support 14, which support is tilted after locking bar 22 has slid off the support. The prop is also maintained by flexible bands 16, 17 and 19, which surround the assembly, and by hook 18, which can be affixed to bar 22.

Quite obviously, the present invention is not limited to the embodiment described and illustrated, and numerous modifications can be made thereto in matters of detail without departing from the scope of the invention.

What is claimed is:

1. A foldable luggage carrier comprising:
    (a) a first frame having an upper end, a lower end, two upright sections, an upper horizontal bar generally transverse to said sections, and a lower horizontal bar generally transverse to said sections, wheels attached to said lower bar, and a baggage support;
    (b) a second frame pivotably mounted to said upper end of said first frame and movable between an operative position in which said second frame forms an extension of said first frame, a storage position in which said second frame is pivoted against said first frame, and a seat position in which said second frame is generally horizontal, said second frame including a seat unit; and
    (c) a movable prop journalled to said second frame and comprising means for simultaneously supporting said second frame in said generally horizontal seat position and said first frame in a generally vertical position, said prop comprising two parallel bars having lower ends, a first crossbar connecting said parallel bars at said lower ends, a plurality of struts, each strut pivotably attached to said first crossbar at one strut end and having a hook at a second strut end, the length of said struts being selected so that when said second frame is in said seat position and said prop is in a generally vertical position with a free end of said prop resting on ground or other surface, the hook of one of said struts engages said lower horizontal bar of said first frame and the hook of another of said struts engages said upper horizontal bar of said first frame.

2. A baggage carrier in accordance with claim 1 wherein said parallel bars have upper ends attached by a second crossbar, said second crossbar being journalled on said second frame and supported by clamps which are attached to said second frame and which are movable about stub shafts into which the ends of said second crossbar are positioned.

3. A baggage carrier in accordance with claim 2 wherein each clamp comprises a generally U-shaped folded plate, each clamp including two branches, one of said branches being longer than the other of said branches, each clamp further comprising a bearing adapted to support said second crossbar and said branches each including a hole adapted to permit passage of a screw, said screw adapted to be secured to said clamp by a wing nut.

4. A baggage carrier in accordance with claim 3 wherein the longer branch of each of said clamps comprises a first stop adapted to retain one of said struts in a raised position when said prop is not in its generally vertical position and a second stop adapted to limit the movement of said prop when it is moved into its generally vertical position.

5. A baggage carrier in accordance with claim 1 wherein said prop includes means for maintaining said prop against said second frame when said second frame occupies its operative position as an extension of said first frame.

6. A baggage carrier in accordance with claim 5 wherein said first crossbar pivotably supports said struts and further comprises a hook which is adapted to engage said upper horizontal bar of said first frame.

7. A baggage carrier in accordance with claim 1 wherein said second frame further comprises a back pivotably mounted to said seat unit and adapted to be placed into a position in which it lies against said seat unit when said second frame is in said operative position.

* * * * *

UNITED STATES PATENT AND TRADEMARK OFFICE
CERTIFICATE OF CORRECTION

PATENT NO. : 4,290,625

DATED : September 22, 1981

INVENTOR(S) : Alain BARRIERE

It is certified that error appears in the above—identified patent and that said Letters Patent is hereby corrected as shown below:

In the Abstract, line 3, "position" should be --positions--.

Column 3, line 65, "shaft" should be --shafts--.

Column 4, line 3, "not" should be --now--.

Signed and Sealed this

Eighth Day of December 1981

[SEAL]

Attest:

GERALD J. MOSSINGHOFF

*Attesting Officer*  *Commissioner of Patents and Trademarks*